UNITED STATES PATENT OFFICE.

ERICH SCHWANENBERG, OF HANOVER, GERMANY.

PROCESS OF PRODUCING ARTIFICIAL STONES.

SPECIFICATION forming part of Letters Patent No. 720,848, dated February 17, 1903.

Application filed July 19, 1902. Serial No. 116,289. (No specimens.)

*To all whom it may concern:*

Be it known that I, ERICH SCHWANENBERG, a subject of the German Emperor, and a resident of No. 29 Arnswaldtstrasse, Hanover, German Empire, have invented a certain new and useful Process of Producing Artificial Stones, of which the following is a description.

The present invention relates to processes for producing artificial stones, and more particularly lithographic stones. In these processes burnt and slaked lime, in part very finely pulverized in suitable quantities, according to the quality and purity of the same, are mixed together, and in some cases a mineral filling material is added. Sufficient water is then added to the mixture to slake the quicklime, whereupon the mixtures will bind. The binding effect is very considerably augmented by placing the mass in suitable molds and subjecting it to very high pressure.

This process is substantially known; and the novelty of the present invention consists in the particular manner of treating the molded stones or slabs with carbonic acid. If, as has hitherto been the case, these stones or slabs are treated with carbonic acid in closed receptacles, the carbonic acid will only penetrate a very short distance into the stone surface, and thus the interior of the slab will be insufficiently hardened. It is also old to repeatedly treat this class of artificial stone with carbonic acid under pressure and *in vacuo;* but even by this method the carbonic acid will not penetrate the stone to the same extent as it will in the present process, which consists in alternately treating the said stone with carbonic acid and air.

In carrying out the process the stones are first placed in a suitable receptacle and then treated with carbonic acid therein. The stones are then removed from the receptacle and placed in the fresh air, or, if they are very heavy stones, they may be left in the receptacle and the carbonic acid driven out of the same by fresh air being forced into it. After a suitable time has been allowed to lapse the stones are again treated with carbonic acid, and this treatment is repeated until the said stones are sufficiently impregnated with carbonic acid.

In making large quantities of the stones the carbonic acid may be taken from one receptacle filled with stones to another, and from this to a third, and so on, so that a continual working will result.

I claim as my invention—

A process for producing artificial stone for lithographic and other purposes, which consists in alternately treating the previously-compressed stone mass, consisting of the ingredients specified, with carbonic acid and fresh air, the latter at the ordinary temperature, substantially as described.

In witness whereof I have hereunto set my hand in presence of two witnesses.

ERICH SCHWANENBERG.

Witnesses:
ALFRED SCHWANENBERG,
C. C. STEVENSON.